(12) United States Patent
Mazor et al.

(10) Patent No.: US 11,206,764 B1
(45) Date of Patent: Dec. 28, 2021

(54) ROBOTIC ARM FOR HARVESTING A FRUIT

(71) Applicant: Nanovel LTD, Ramot Menashe (IL)

(72) Inventors: Itzhak Mazor, Haifa (IL); Yoram Hanfling, Pardes Hana Karkur (IL); Wissam Yakuv, Kfar-Yasif (IL); Doron Mazor, Kibutz Beit Oren (IL)

(73) Assignee: Navonel Ltd., Ramot Menashe (IL)

( * ) Notice: Subject to any disclaimer, the term of this patent is extended or adjusted under 35 U.S.C. 154(b) by 0 days.

(21) Appl. No.: 17/081,921

(22) Filed: Oct. 27, 2020

(51) Int. Cl.
| | |
|---|---|
| *A01D 46/30* | (2006.01) |
| *B25J 15/00* | (2006.01) |
| *A01D 46/24* | (2006.01) |

(52) U.S. Cl.
CPC ............ *A01D 46/30* (2013.01); *A01D 46/24* (2013.01); *B25J 15/0019* (2013.01)

(58) Field of Classification Search
CPC .... B25J 15/0019; A01D 46/24; A01D 46/253; A01D 46/30
See application file for complete search history.

(56) References Cited

U.S. PATENT DOCUMENTS

| | | | | |
|---|---|---|---|---|
| 2,990,669 A | * | 7/1961 | Klemm, Jr. .......... | A01D 46/253 56/334 |
| 3,377,787 A | * | 4/1968 | McCann .............. | A01D 46/253 56/328.1 |
| 3,572,021 A | * | 3/1971 | McDonald ........... | A01D 46/253 56/334 |
| 4,663,925 A | * | 5/1987 | Terada ................... | A01D 46/24 382/153 |
| 4,718,223 A | * | 1/1988 | Suzuki .................. | A01D 46/30 56/328.1 |
| 5,005,347 A | * | 4/1991 | Kedem ................ | A01D 46/253 56/328.1 |
| 7,540,137 B2 | * | 6/2009 | Gray ....................... | B25J 5/005 56/328.1 |
| 7,810,305 B2 | * | 10/2010 | Macidull .............. | A01D 46/247 56/334 |
| 2020/0323140 A1 | * | 10/2020 | Gielis .................... | A01D 46/24 |

* cited by examiner

*Primary Examiner* — Adam J Behrens
(74) *Attorney, Agent, or Firm* — Reches Patent

(57) ABSTRACT

A robotic arm and a method for harvesting a fruit. The robotic arm includes (i) a cutting unit that includes a fruit support element, stem cutting elements and an intermediate frame, (ii) a manipulator that is configured to (a) move the cutting unit of the robotic arm to a stem cutting position, and (b) move the stem cutting elements during a cutting of a stem connected to the fruit. When positioned in the stem cutting position, the intermediate frame is configured to substantially surround an intermediate portion of the fruit, the fruit support element is configured to support a lower portion of the fruit, and the stem cutting elements are configured to perform a movement between a first position to a second position thereby cutting the stem. The movement includes an elevating of the stem cutting elements.

14 Claims, 11 Drawing Sheets

ROBOTIC ARM FOR HARVESTING A FRUIT

BACKGROUND

Fruit harvesting is a complex task that requires to approach the fruit that is connected to a stem, and cut the stem in an accurate manner and with minimal damage to the fruit.

Most fruits are harvested in a manual manner—which is highly inefficient.

There is a growing need to provide a robotic arm that may cut the stem in an accurate manner and with minimal damage to the fruit.

SUMMARY

There may be provided systems, and methods as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
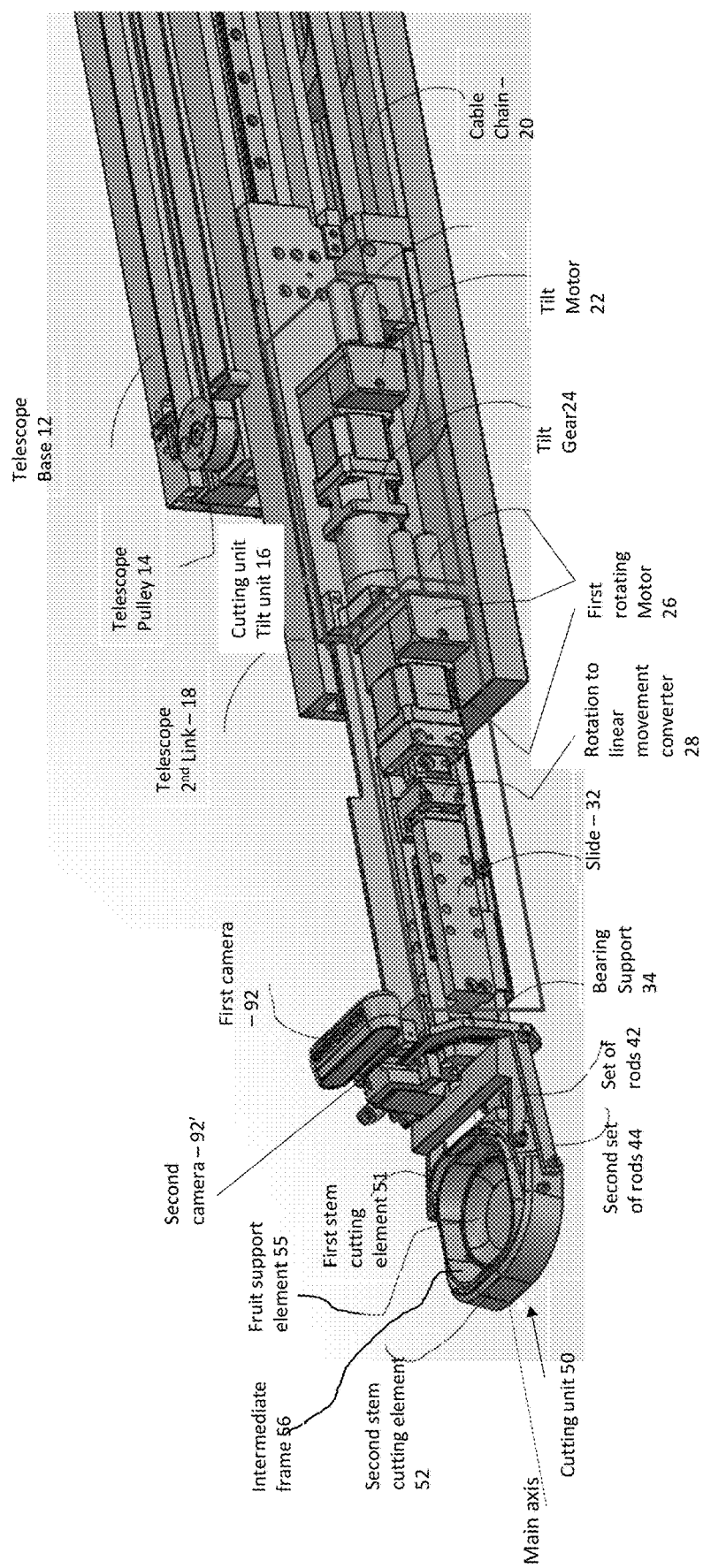
FIGS. 1-11 illustrate examples of a robotic arm.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method.

Any reference in the specification to a system or device should be applied mutatis mutandis to a method that may be executed by the system.

Any combination of any module or unit listed in any of the figures, any part of the specification and/or any claims may be provided.

There may be provided a robotic arm for harvesting a fruit connected to a stem.

The robotic arm may include a cutting unit that is moved, by a manipulator to be positioned in a stem cutting position in which the fruit is supported by a fruit support element, and at least have its intermediate portion surrounded to reduce movements of the fruit during the cutting. The cutting may be performed by one or more stem cutting elements—for example by a first stem cutting element that has a blade and a second stem cutting element that has a cutting surface. The stem cutting element may move from a first positioned to a second position. When in the first position the one or more stem cutting elements may allow the fruit to be positioned within an intermediate frame of the cutting head. The movement to the second position in which the stem is cut include elevating the one or more stem cutting elements.

The fruit may also be pressed between the fruit support element and one or more stem cutting element to further stabilize the fruit and reduce movements during the cutting of the stem. The pressing also reduces the distance between a blade of the cutting unit and the stem end—to each the removal of virtually the entire stem.

The fruit may be further stabilized by a movement of the cutting unit and the fruit support element that will further press the fruit.

Any pressure applied on the fruit is small enough such as not to damage the fruit. The pressure may be set per fruit type. For example—the fruit may be pressurized by a pressure of 0.5 kilo.

FIGS. 1-11 illustrate examples of a robotic arm. Some of the drawings also illustrate fruit 100 and stem 102.

FIGS. 1-11 illustrates examples of a robotic arm and/or of parts of the robotic arm at different positions.

FIG. 1 illustrates an example of robotic arm 10. It illustrates telescope base 12, telescope pulley 14 and telescope second link 18, that may move various parts of the arm in a linear movement towards (or away from) a body (not shown) of robot that includes the robotic arm. It should be noted that the parts of the arm may be moved in any manner—linear, non-linear, and in any direction by mechanical elements (such as a motor, a gear, and the like). configured to allow such movements.

A tilt unit 16 that may include tilt motor 22, tilt gear 24 and rotating motor 26) for rotating the cutting unit about the main axis.

Figure 9:
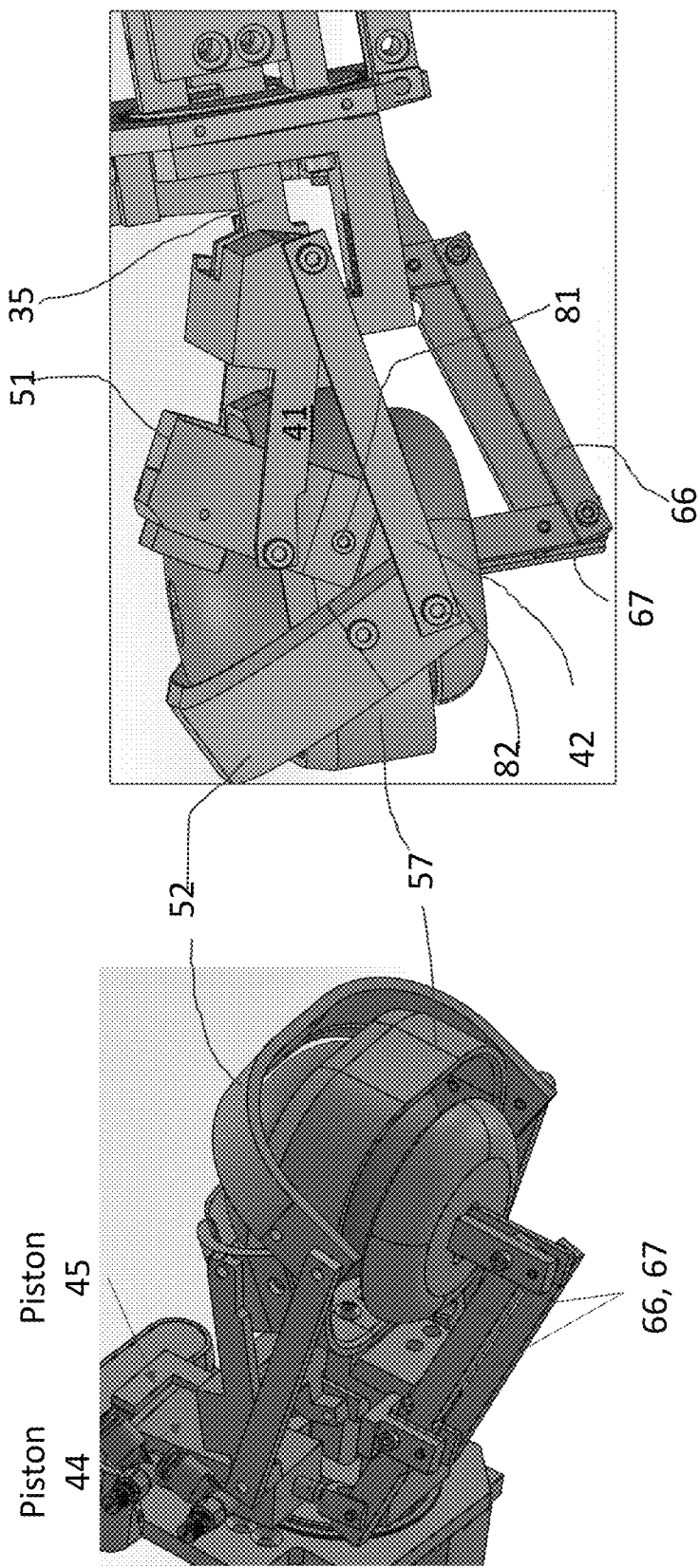

The robotic arm may include a cutting unit 50 that includes elements that may be moved between a first position to a second position thereby cutting the stem. The movement of these elements may be controlled in various manners—for example by moving one or more elements—such as control rod 35. FIGS. 1 and 9 illustrates that the control rod 35 is linearly moved towards the fruit (thereby closing the cutting unit towards a second position) or from the fruit (thereby opening the cutting unit towards a first position). Any movement other than linear movement may be provided. In FIG. 9 the linear movement of the control rod 35 is generated by (a) rotating first rotating motor 26 (the rotation does not tilt the robotic arm), (b) converting the rotation to linear movement by rotation to linear movement converter 28 (may include slide 32 and bearing support 34).

The robotic arm may also include one or more cameras. For example—the robotic arm may include a first camera 92 and controller (not shown) for controlling the operation of the robotic arm. First camera 92 is an example of a sensor that may senses the fruit and its surroundings. The second camera 92' may be image the fruit from closer range—for example when the fruit is surrounded by the cutting unit Images from the second camera 92' may be processed to determine whether the fruit is properly placed in the cutting unit.

The cutting unit 50 includes first stem cutting element 51, second stem cutting element 52, intermediate frame 57, and fruit support element 55.

Figure 2:
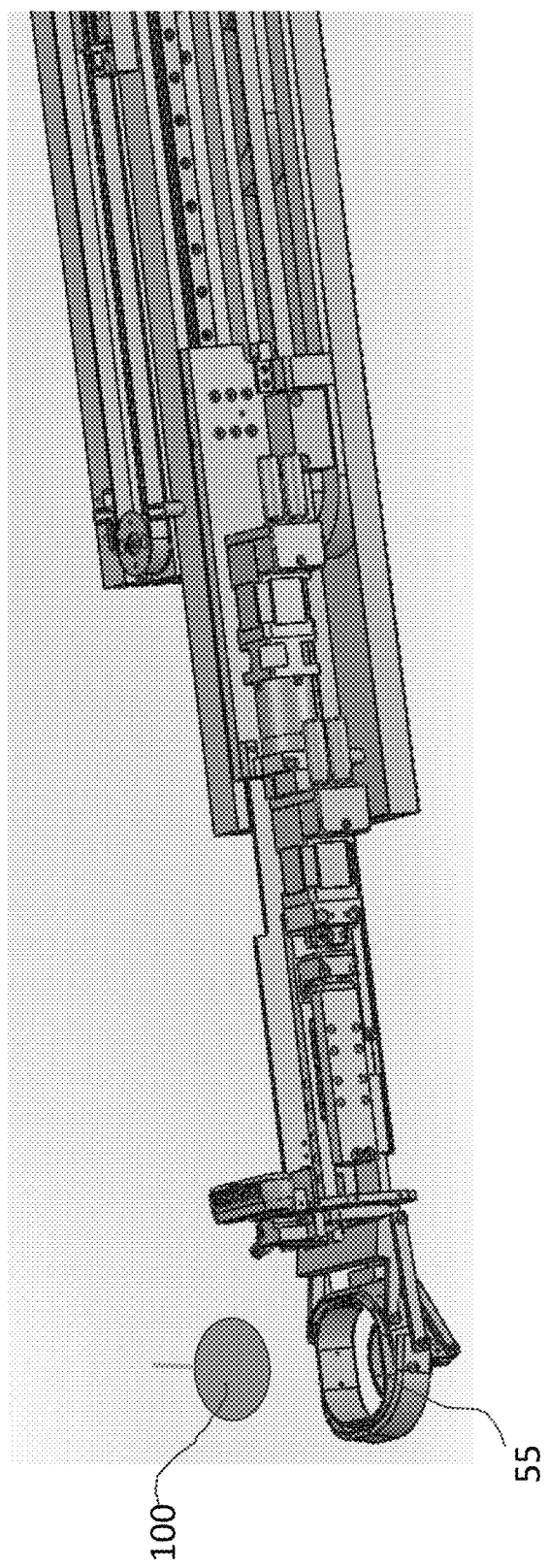

FIG. 2 illustrates an example of robotic arm 10 and fruit 100 during an initial phase of the fruit harvesting—in which the cutting unit is proximate to the fruit.

Figure 3:
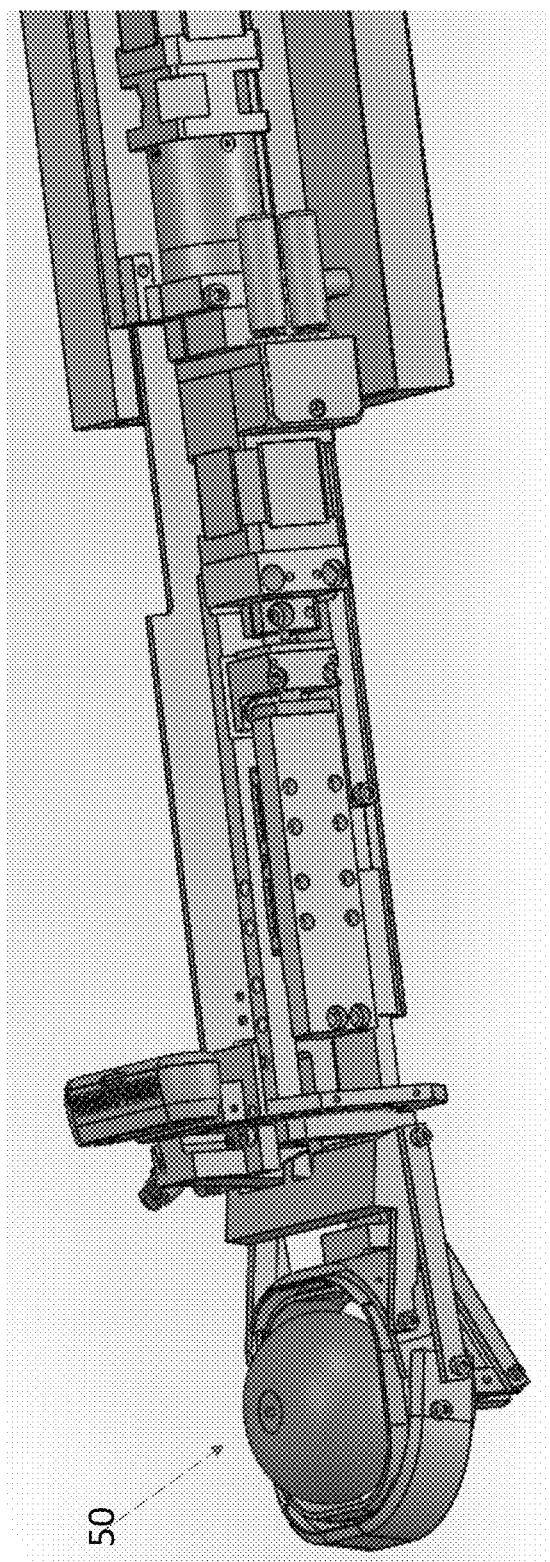

FIG. 3 illustrates an example of robotic arm 10 and fruit 100 during an intermediate phase of the fruit harvesting—in which the fruit supporting element moves upwards while the cutting unit moves downwards. One or more stem cutting elements (for example first and second stem cutting elements 51 and 52) are located at a first position.

Figure 4:
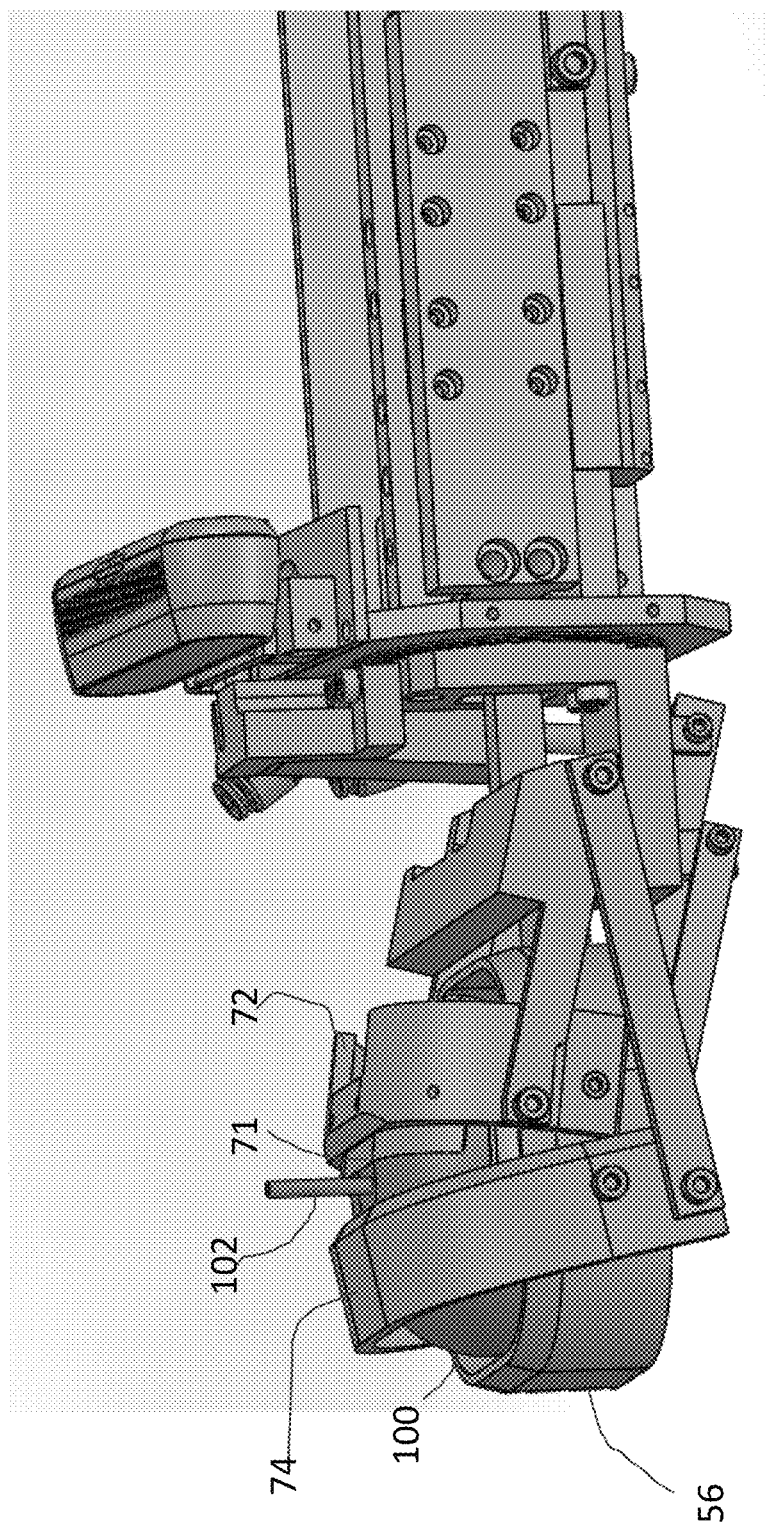

FIG. 4 illustrates an example of robotic arm 10 and fruit 100, at a point in time in which the one or more stem cutting elements are close to the stem and are about to reach a second position. The movement between the first position to the second position involves elevating the one or more stem cutting elements.

Figure 5:
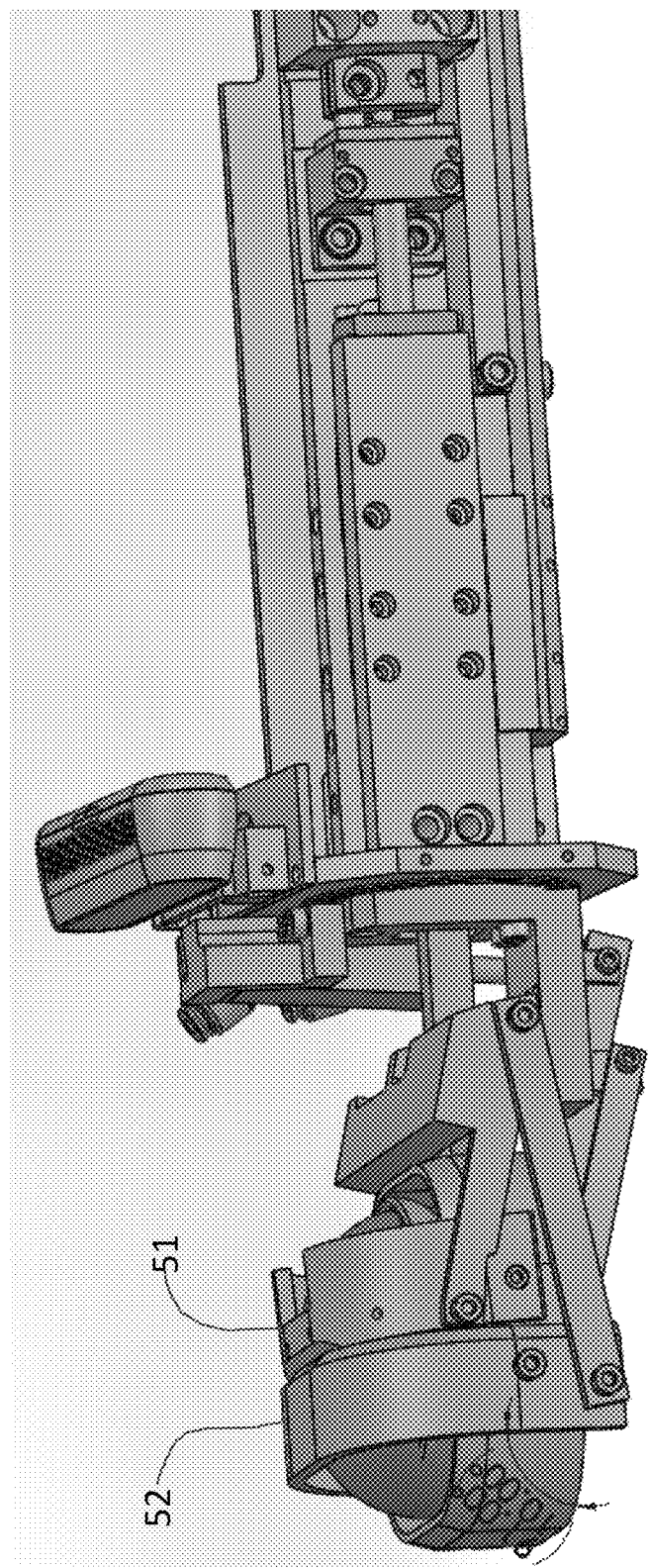

FIG. 5 illustrates an example of robotic arm 10 and a fruit 100 when the cutting of the stem is completed—and the one or more stem cutting elements are at a second position.

Figure 6:
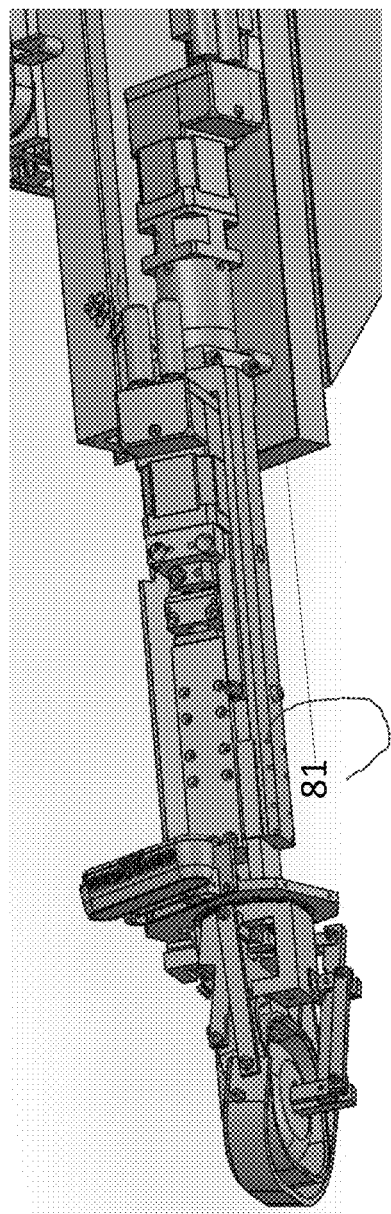
Figure 7:
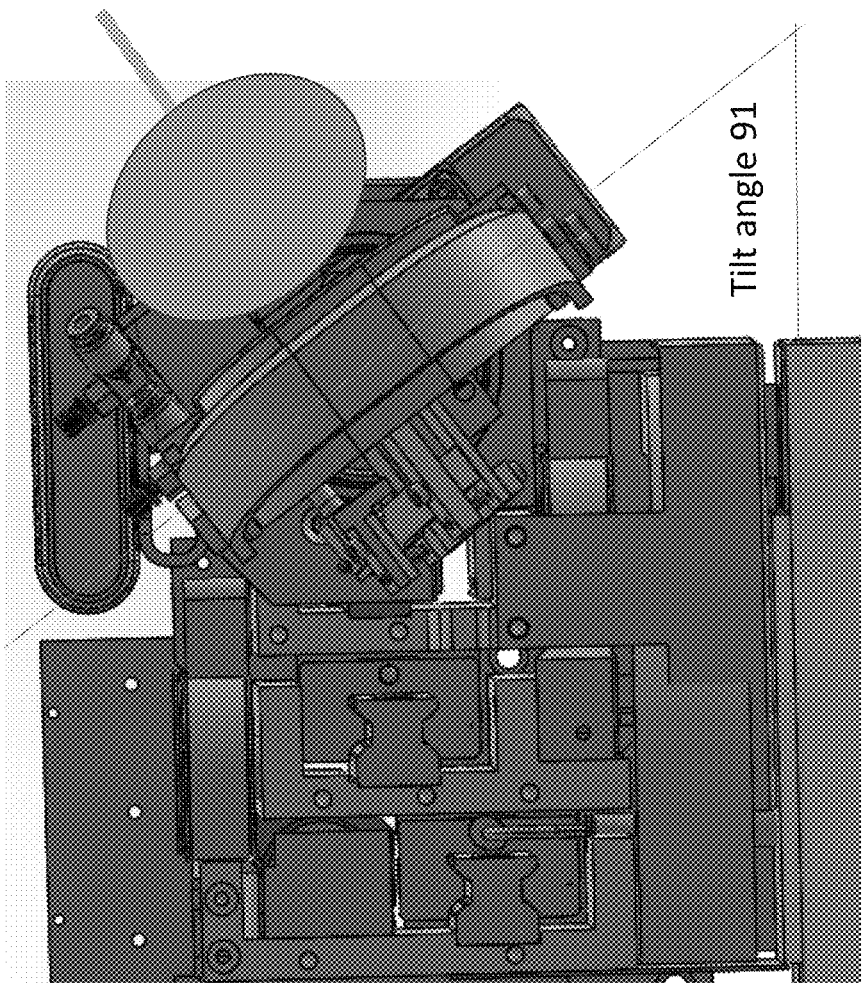
Figure 8:
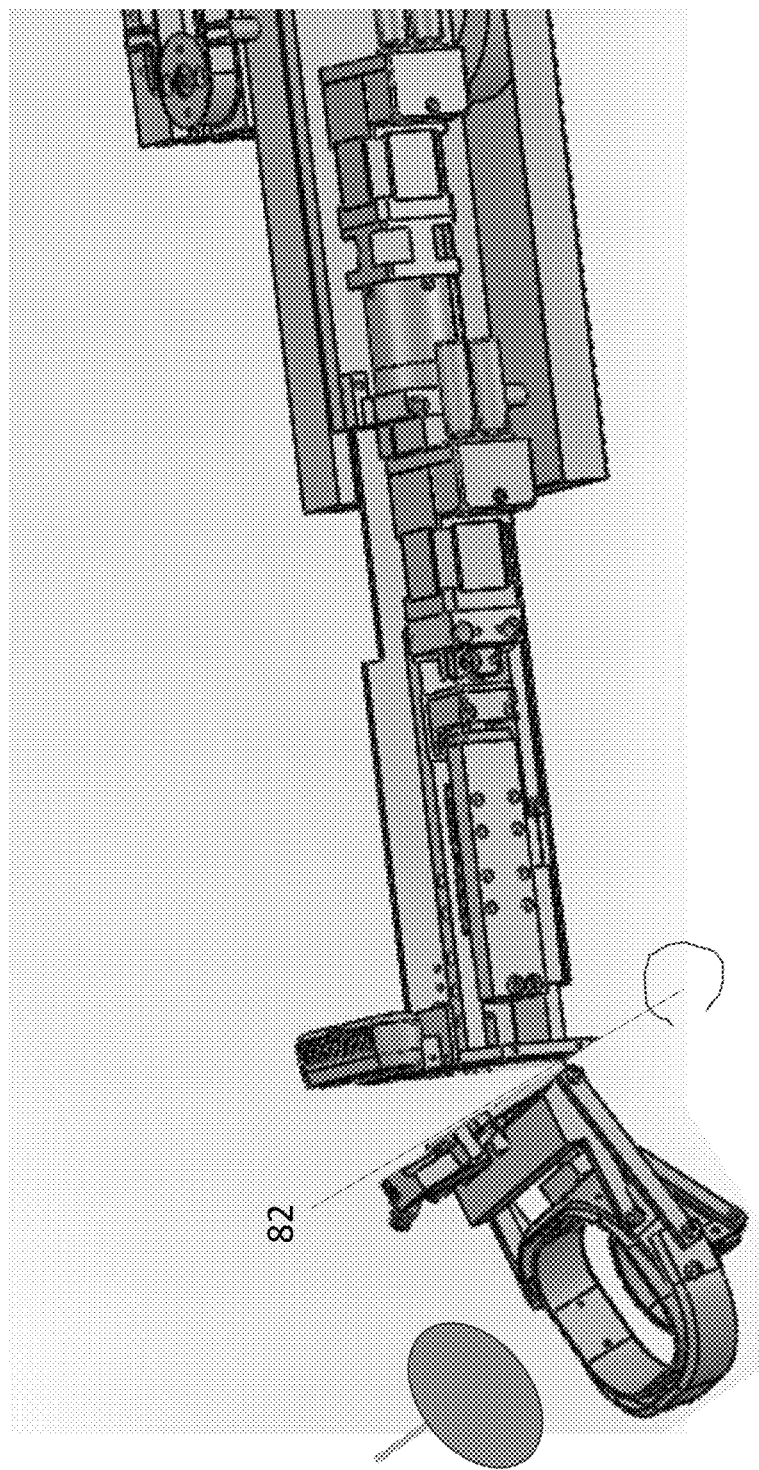

FIGS. 6 and 7 illustrates a rotation (tilting at tilt angle 91) of the cutting unit along a first axis of rotation 81. FIG. 8 illustrates a rotation of the cutting unit along a second axis of rotation 82.

These rotations assists in aligning the cutting head with the fruit—especially with a virtual axis that represent a normal to a plane of cutting the stem.

Figure 10:
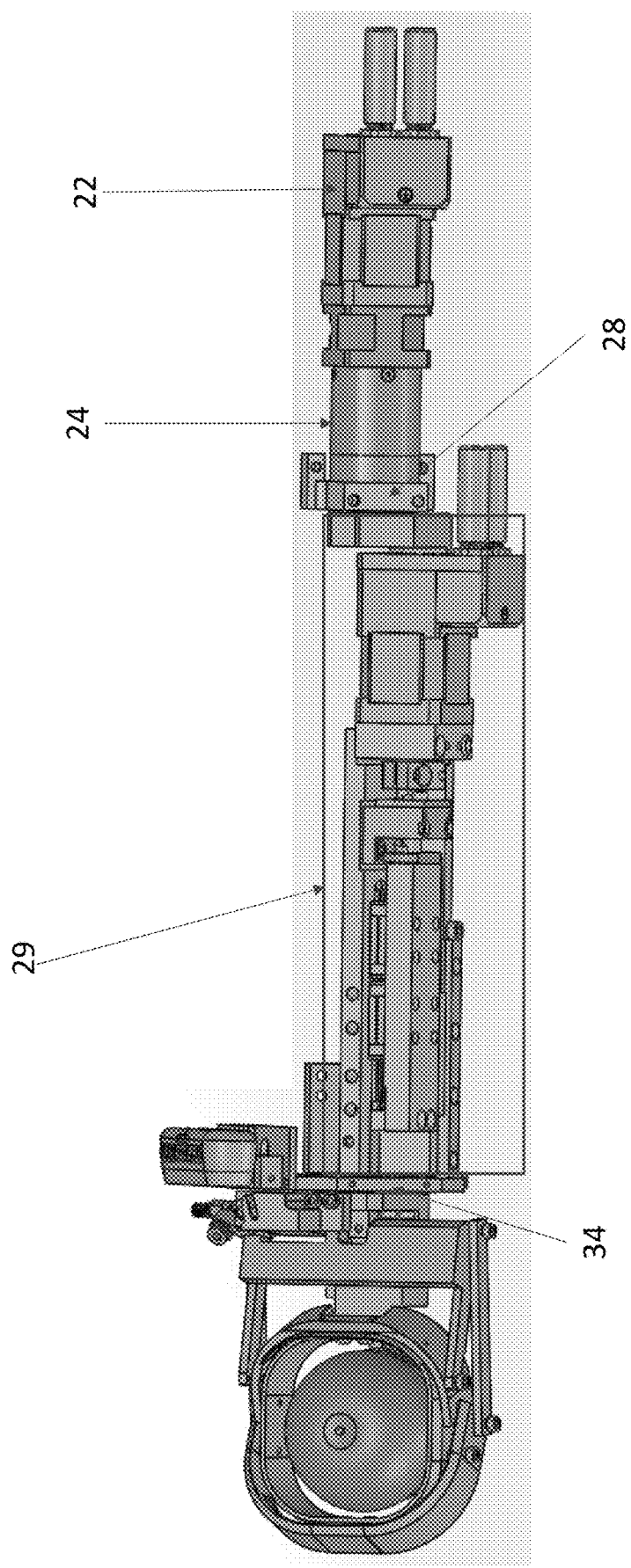

FIGS. 9 and 10 illustrate various parts of the cutting head and manipulator.

First rod 41 is coupled to first stem cutting element 51 for rotating the first stem cutting element 51 about a third axis of rotation 83.

Second rod 42 is coupled to second stem cutting element 52 for rotating the second stem cutting element 51 about a fourth axis of rotation 84.

First set of rods 66 and second sets of rods 67 belong to fruit support element and are connected to a bottom of the fruit support element and may move the fruit support elements upwards and/or downwards while the fruit support element supports the fruit.

Intermediate frame 57 surrounds an intermediate part of the fruit thereby preventing the fruit from falling from the fruit support element.

Tilt motor 22 may rotate the cutting unit and intermediate elements 29 about the first axis of rotation. The tilt 22 motor is mechanically coupled to tilt gear 24, bearing housing 28, intermediate elements 29, and bearing support 34 that is mechanically coupled to the cutting unit.

Figure 11:
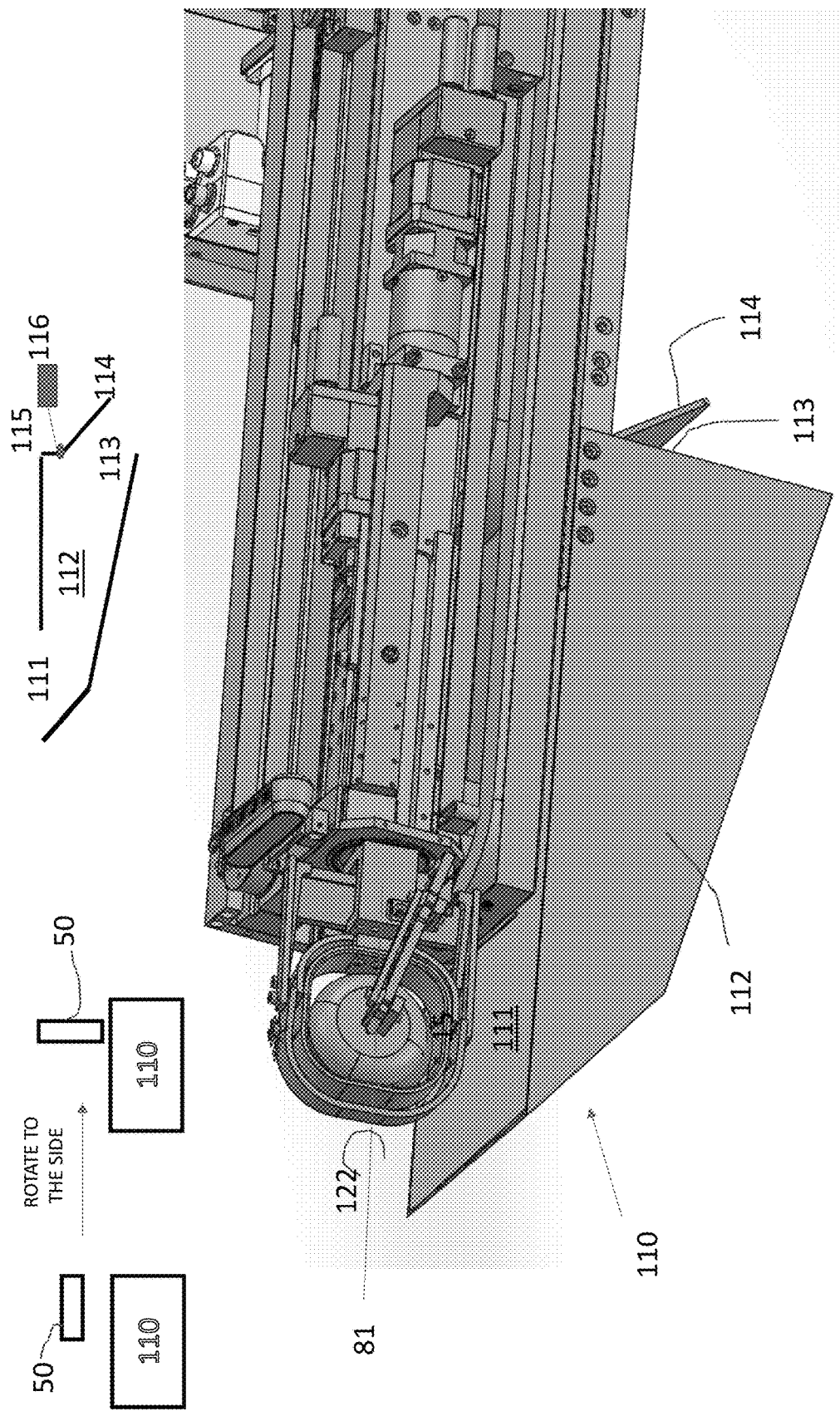

FIG. 11 illustrates the provision of the fruit from the cutting unit to a buffer 110.

Buffer has a top opening 111, a body 112 for storing multiple fruits, an opening 113 and a door 114 that closes the opening to enable the buffer body to store some fruits. The door 114 may be opened to allow the release of buffered fruits from the buffer. The door may be opened in any manner—for example by being moved, rotated, folded and the like by a motorized unit such as a motor 116 that rotates an axel 115 that rotates the door. In FIG. 11 the door is illustrated in an open position.

In order to provide the fruit from the cutting unit 50 to the opening—the cutting unit is rotated about axis 81. The fruit may also be pushed outside the cutting unit in any other manner.

The following reference numbers are being used in the specification:
12 Telescope base
14 Telescope pulley
16 Cutting unit tilt unit
18 Second telescope link
20 Cable chain
22 Tilt motor
24 Tilt gear
28 Rotation to linear movement converter
29 Intermediate elements
30 Cutting unit actuator
32 Slide (Linear movement unit)
34 Bearing support
35 Control rod
41 First rod
42 Second rod
50 Cutting unit
51 First stem cutting element
52 Second stem cutting element
55 Fruit support element
57 Intermediate frame
61 First stem cutting element manipulator
62 Second stem cutting element manipulator
65 Fruit support element manipulator
66 First set of rods
67 Second set of rods
71 Blade
72 Blade support element
73 Cutting surface
74 Cutting surface support element
81 First axis of rotation
82 Second Axis of rotation
83 Third axis of rotation
84 Fourth axis of rotation
92 First camera
92' Second camera
110 Buffer
111 Buffer input
112 Buffer body
113 Buffer output
114 Buffer door
115 Door axel
116 Motor While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Any reference to "comprising" should be applied "mutatis mutandis to "consisting" and should be applied mutatis mutandis to "consisting essentially of".

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A robotic arm for harvesting a fruit, the robot arm comprises:
    a cutting unit that comprises a fruit support element, stem cutting elements and an intermediate frame;
    a manipulator that is configured to (a) move the cutting unit of the robotic arm to a stem cutting position, and (b) move the stem cutting elements during a cutting of a stem connected to the fruit;
    wherein when positioned in the stem cutting position, the intermediate frame is configured to substantially surround an intermediate portion of the fruit, the fruit support element is configured to support a lower portion of the fruit, and the stem cutting elements are configured to perform a movement between a first position to a second position thereby cutting the stem;
    wherein the movement comprises an elevating of the stem cutting elements; and
    wherein at least one of the following is true:
        (i) the stem cutting elements at least partially surrounds parts of the intermediate frame when positioned in the first position; and
        (ii) the manipulator is configured to (a) move the cutting unit to an intermediate position in which the fruit is supported by the fruit support element, and (b) to elevate the fruit support element while lowering the cutting unit to the stem cutting position.

2. The robotic arm according to claim 1 wherein the stem cutting elements comprises comprise a first stem cutting element and a second stem cutting element, wherein the first stem cutting element comprises a blade and a blade support element, wherein the second stem cutting element comprises a cutting surface and a cutting surface support element.

3. The robotic arm according to claim 1 wherein the stem cutting elements comprises two cutting elements that are configured to perform a rotational movement towards each other.

4. The robotic arm according to claim 1 wherein the stem cutting elements comprise a first stem cutting element and a second stem cutting element; wherein when positioned in the first position, a distance between the first stem cutting element and the intermediate frame exceeds a distance between the second stem cutting element and the intermediate frame.

5. The robotic arm according to claim 1 wherein the stem cutting elements are higher than the intermediate frame when positioned at the second position.

6. The robotic arm according to claim 1 wherein the fruit support element is configured to press the fruit against the stem cutting elements when the stem cutting elements cut the stem.

7. The robotic arm according to claim 1 comprising a sensor and a controller, wherein the sensor is configured to sense the fruit and wherein the controller is configured to control the manipulator based on the sensing of the fruit.

8. The robotic arm according to claim 1 wherein the manipulator is configured to rotate the cutting unit about two axes of rotation that are oriented to each other.

9. The robotic arm according to claim 8 wherein the stem cutting elements comprises two cutting elements that are configured to perform a rotational movement, about rotation axes that are oriented to one of the two axes of rotation.

10. The robotic arm according to claim 1 wherein the manipulator comprises a fruit support element manipulator, stem cutting elements manipulators, and a cutting unit manipulator.

11. The robotic arm according to claim 10 wherein the stem cutting element manipulators are attached to a linear movement unit that is configured to perform a linear movement, wherein the stem cutting element manipulators are configured to convert the linear movement to the movement of the stem cutting elements between the first position to the second position.

12. The robotic arm according to claim 1 wherein the manipulator comprises a fruit support element manipulator that is configured to manipulate the fruit support element, the fruit support element manipulator comprises at least one set of rods, the at least one set comprises a first rod and a second rod that is rotatably coupled to the first rod.

13. The robotic arm according to claim 1 wherein the manipulator comprises a stem cutting element manipulator for each one of the stem cutting elements, the stem cutting element manipulator for each one of the stem cutting elements comprises at least one rod.

14. A method for harvesting by a robotic arm, a fruit connected to a stem, the method comprises:
    positioning, by a manipulator of the robotic arm, a cutting unit of the robotic arm at a proximity of the fruit; wherein stem cutting elements of the cutting unit are positioned at a first position;
    moving, by the manipulator, the cutting unit of the robotic arm to a stem cutting position; wherein when positioned in the stem cutting position, substantially surrounding an intermediate portion of the fruit by an intermediate frame of the cutting unit, and supporting the fruit by a fruit support element of the cutting unit; and
    moving the stem cutting elements to a second position thereby cutting the stem; wherein the moving of the stem cutting elements comprises an elevating of the stem cutting elements; and
    wherein at least one of the following is true:
    (i) the stem cutting elements at least partially surrounds parts of the intermediate frame when positioned in the first position; and
    (ii) the manipulator is configured to (a) move the cutting unit to an intermediate position in which the fruit is supported by the fruit support element, and (b) to elevate the fruit support element while lowering the cutting unit to the stem cutting position.

* * * * *